(12) United States Patent
Tang et al.

(10) Patent No.: US 11,314,594 B2
(45) Date of Patent: Apr. 26, 2022

(54) METHOD, DEVICE AND COMPUTER PROGRAM PRODUCT FOR RECOVERING DATA

(71) Applicant: EMC IP Holding Company LLC, Hopkinton, MA (US)

(72) Inventors: Haiying Tang, Beijing (CN); Zhilong Wu, Beijing (CN); Jianbin Kang, Beijing (CN); Rongrong Shang, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/023,815

(22) Filed: Sep. 17, 2020

(65) Prior Publication Data

US 2021/0279135 A1 Sep. 9, 2021

(30) Foreign Application Priority Data

Mar. 9, 2020 (CN) .......................... 202010158555.4

(51) Int. Cl.
*G06F 11/00* (2006.01)
*G06F 11/10* (2006.01)

(52) U.S. Cl.
CPC ...... *G06F 11/1084* (2013.01); *G06F 11/1004* (2013.01); *G06F 11/1092* (2013.01); *G06F 2211/1057* (2013.01)

(58) Field of Classification Search
CPC ............. G06F 11/1004; G06F 11/1076; G06F 11/1084; G06F 11/1092; G06F 2211/1057
See application file for complete search history.

(56) References Cited

U.S. PATENT DOCUMENTS

| 8,006,126 | B2 * | 8/2011 | Deenadhayalan .. G06F 11/1076 714/6.1 |
| 8,706,701 | B1 | 4/2014 | Stefanov et al. |
| 9,323,765 | B1 | 4/2016 | Stefanov et al. |
| 9,354,975 | B2 | 5/2016 | Aliev et al. |
| 9,356,626 | B2 | 5/2016 | Alexeev et al. |
| 9,513,994 | B2 | 12/2016 | Bonwick |
| 9,641,615 | B1 | 5/2017 | Robins et al. |

(Continued)

OTHER PUBLICATIONS

Moussa, Mohamad, Beyond RAID 6—Efficient Error Correcting Code for Dual-Disk Corruption, 2018, University of Arizona (Year: 2018).*

(Continued)

*Primary Examiner* — Marc Duncan
(74) *Attorney, Agent, or Firm* — BainwoodHuang

(57) ABSTRACT

Techniques involve determining whether data read from a redundant array of independent disks (RAID) is corrupted, the RAID including two parity disks. The techniques further involve determining, based on the read data being corrupted, whether single-disk data recovery can recover the corrupted data. The techniques further involve recovering, based on the single-disk data recovery failing to recover the corrupted data, the corrupted data using dual-disk data recovery. Such techniques may present a recovery solution for silent data corruption of a RAID with two parity disks, such that corrupted data can be recovered in the case of either a single-disk failure or a dual-disk failure, thereby improving the storage system performance.

20 Claims, 5 Drawing Sheets

(56) References Cited

U.S. PATENT DOCUMENTS

| | | | |
|---|---|---|---|
| 9,905,289 B1 | 2/2018 | Jeon et al. | |
| 10,162,548 B2 | 12/2018 | Robins et al. | |
| 10,236,054 B1 | 3/2019 | Jeon et al. | |
| 10,466,913 B2 | 11/2019 | Bonwick | |
| 10,990,474 B1* | 4/2021 | Bent | G06F 11/1076 |
| 11,119,803 B2 | 9/2021 | Krasner et al. | |
| 11,119,856 B2 | 9/2021 | Bonwick | |
| 11,151,056 B2 | 10/2021 | Shveidel et al. | |
| 2004/0123032 A1* | 6/2004 | Talagala | G06F 11/1076 |
| | | | 711/114 |
| 2006/0248378 A1* | 11/2006 | Grcanac | G06F 11/1076 |
| | | | 714/6.12 |
| 2007/0106925 A1* | 5/2007 | Moore | G06F 11/1076 |
| | | | 714/770 |
| 2009/0259882 A1* | 10/2009 | Shellhamer | G06F 11/1076 |
| | | | 714/6.32 |
| 2013/0198585 A1* | 8/2013 | Braam | G06F 11/1076 |
| | | | 714/763 |

OTHER PUBLICATIONS

Li, Mingqiang et al, Toward I/O-Efficient Protection Against Silent Data Corruptions in RAID Arrays, 2014, IEEE (Year: 2014).*

* cited by examiner

METHOD, DEVICE AND COMPUTER PROGRAM PRODUCT FOR RECOVERING DATA

CROSS-REFERENCE TO RELATED APPLICATION

This application claims priority to Chinese Patent Application No. CN202010158555.4, on file at the China National Intellectual Property Administration CNIPA), having a filing date of Mar. 9, 2020, and having "METHOD, DEVICE AND COMPUTER PROGRAM PRODUCT FOR RECOVERING DATA" as a title, the contents and teachings of which are herein incorporated by reference in their entirety.

TECHNICAL FIELD

Embodiments of the present disclosure generally relate to the field of data storage technologies, and more specifically to a method, a device, and a computer program product for recovering data.

BACKGROUND

Redundant array of independent disks (RAID) is a data backup technology that can combine a plurality of independent physical disks in different ways to form an array of disks (i.e., logical disks), thereby providing higher storage performance and higher unfailing performance than those of a single disk. In order to recover data when a disk in the RAID fails, a parity check information block (e.g., RAID 5) or a plurality of parity check information blocks (e.g., RAID 6) is usually provided in the RAID. Taking RAID 6 as an example, if data in one or two disks of RAID 6 fails, RAID 6 can calculate data in the failing disk(s) based on the check information.

Generally, in a RAID, there may be a plurality of disks equal to or larger than a width of the RAID, where each disk is divided into a plurality of slices, and each slice may have a fixed size (e.g., 4GB). The RAID usually stores data in stripes. For example, in RAID 6, 6 slices on 6 disks may be combined to form a RAID stripe set. The stripe set is also known as "Uber," which includes a plurality of stripes. That is, 4 data blocks and 2 parity blocks (i.e., "4D+P+Q") can form a stripe. When a disk in the RAID fails, the disk can be reestablished based on the parity information, such that data can be recovered, and will not be lost.

SUMMARY OF THE INVENTION

Embodiments of the present disclosure provide a method, a device, and a computer program product for recovering data.

In an aspect of the present disclosure, a method for recovering data is provided. The method includes: determining whether data read from a redundant array of independent disks (RAID) is corrupted, the RAID including two parity disks; determining, based on determining that the read data is corrupted, whether single-disk data recovery can recover the corrupted data; and recovering, based on determining that the single-disk data recovery fails to recover the corrupted data, the corrupted data using dual-disk data recovery.

In another aspect of the present disclosure, an electronic device is provided. The device includes a processing unit and a memory, where the memory is coupled to the processing unit and stores instructions. The instructions, when executed by the processing unit, execute the following actions: determining whether data read from a redundant array of independent disks (RAID) is corrupted, the RAID including two parity disks; determining, based on determining that the read data is corrupted, whether single-disk data recovery can recover the corrupted data; and recovering, based on determining that the single-disk data recovery fails to recover the corrupted data, the corrupted data using dual-disk data recovery.

In still another aspect of the present disclosure, a computer program product is provided. The computer program product is tangibly stored in a non-transient computer-readable medium and includes computer-executable instructions. The computer-executable instructions, when executed, cause a computer to execute the method or process according to the embodiments of the present disclosure.

The Summary of the Invention is provided to introduce a selection of concepts in a simplified form, which will be further described in the Detailed Description below. The Summary of the Invention is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
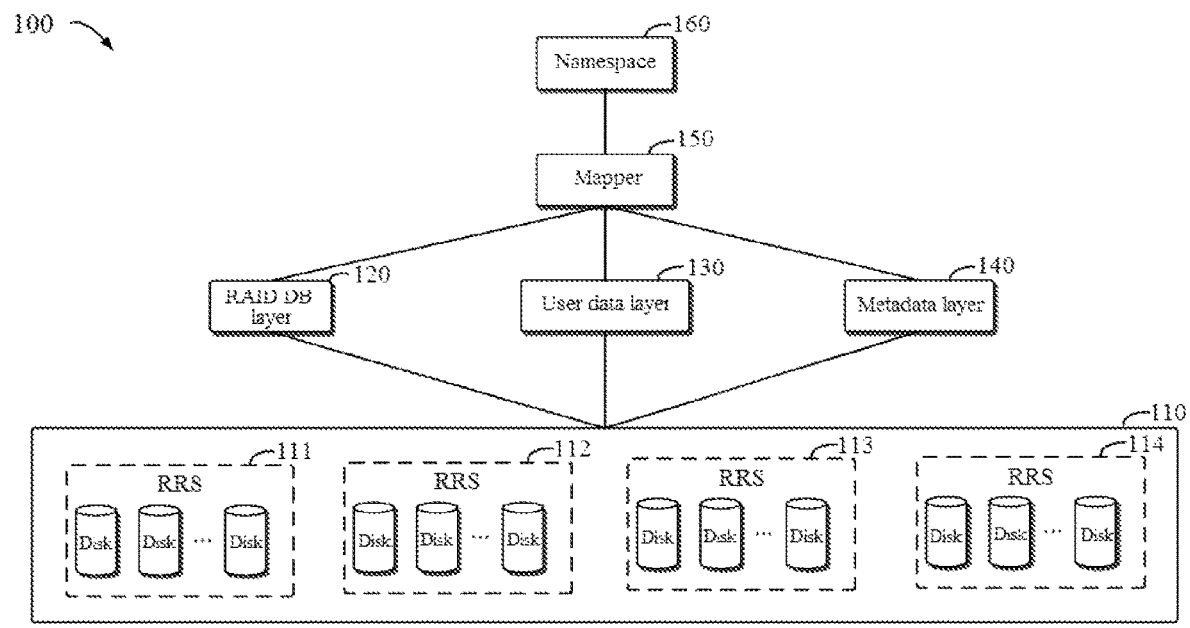
FIG. 1 shows a schematic diagram of an example environment of a storage system according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. In contrast, these embodiments are provided to make the present disclosure more thorough and complete, and fully convey the scope of the present disclosure to those skilled in the art.

The term "including" and variants thereof used herein indicate open-ended inclusion, i.e., "including, but not limited to." Unless specifically stated otherwise, the term "or" indicates "and/or."

The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects, unless specifically indicated otherwise.

Silent data corruption, also referred to as static data corruption, refers to data failure that is not detected by disk firmware or a host operating system. When a user sends a read command to a hard drive, and data returned by the hard drive is different from original write data, it is determined that there is silent data corruption. However, disk hardware or software is unaware of such data corruption before or during reading the data. This corruption event may be transient, or may be permanent data corruption. However, a conventional storage system does not have a recovery solution for silent data corruption of a RAID with two parity disks.

Thus, an embodiment of the present disclosure presents a recovery solution for silent data corruption of the RAID with two parity disks, such that corrupted data can be recovered in the case of either a single-disk failure or a dual-disk failure, thereby improving the storage system performance. According to the embodiment of the present disclosure, dual-disk recovery for silent data corruption can be supported.

It should be understood that while RAID 6 is used as an example of a RAID including two parity disks in some embodiments of the present disclosure, any other RAID including two parity disks that is known or is to be developed in the future may be used in combination with the embodiments of the present disclosure.

The basic principles and some example implementations of the present disclosure are illustrated below with reference to FIG. 1 to FIG. 8. It should be understood that these example embodiments are provided merely to enable those skilled in the art to better understand and then implement the embodiments of the present disclosure, and are not intended to imply any limitation to the scope of the present disclosure.

FIG. 1 shows a schematic diagram of example environment 100 of a storage system according to embodiments of the present disclosure. As shown in example environment 100 of FIG. 1, storage pool 110 includes a plurality of RAID Resiliency Sets or RRSs 111, 112, 113, and 114, and each RRS forms a failure domain, which means that if a disk drive in an RRS fails, the disk drive will not affect the reliability of other RRSs. Storage pool 110 manages all disk drives in the storage system. In an embodiment of the present disclosure, each RRS may include a plurality of disk drives, e.g., 5 to 25 disk drives.

Each disk may be divided into fixed-size disk slices, e.g., may be divided into 4GB-sized slices. A plurality of slices on different disks can form a stripe set (Uber), and a plurality of stripe sets can form a mapper layer. For example, a stripe set may be allocated from storage pool 110. If a RAID is of the RAID 5 type, 5 idle slices need to be allocated from 5 disks to create a stripe set, so as to form a RAID 5 stripe set. If a RAID is of the RAID 6 type, 6 idle slices need to be allocated from 6 disks to create a stripe set, so as to form a RAID 6 stripe set. In addition, it is necessary to ensure that all slices included in a stripe set are derived from the same RRS. Each stripe set includes a plurality of RAID stripes. In some embodiments, each stripe in the stripe set may have a size of 2 MB, and is also known as a physical large block (PLB).

Storage pool 110 will expose some layers (e.g., user data layer 130 and metadata layer 140), for use by other components. Each layer may include a plurality of stripe sets. Each layer applies its own RAID policy based on its data type. All stripe sets in a layer apply the same RAID policy, such as the same RAID width and RAID type. Layers may be expanded as needed, such that new stripe sets may be dynamically allocated, and may be allocated to corresponding layers.

As shown in example environment 100, RAID database (DB) layer 120, user data layer 130, metadata layer 140, and the like may be established, and these layers are mapped into a namespace 160 respectively by mapper 150 for use by an external host. Storage pool 110, RAID database layer 120, user data layer 130, metadata layer 140, mapper 150 and the like may constitute a whole RAID system. RAID DB layer 120 only includes a single stripe set, will not be exposed, and is consumed only by RAID contents. User data layer 130 uses RAID 5 and/or RAID 6. RAID type and width depend on the types and number of disks in the system, e.g., RAID 5 that generally supports 4+1, 8+1, or 16+1, and RAID 6 that generally supports 4+2, 8+2, or 16+2. Generally speaking, 2 copies of mirror images or 3 copies of mirror images may be set for each layer, depending on the protection level of specific data.

Mapper 150 is a core component in the RAID, which regards each layer as a planar linear physical address space, and further exposes a single planar linear logical address space to namespace 160. For example, the logical address space may be very large. In some embodiments, mapper 150 maintains mapping between logical addresses and physical addresses in a 4K page granularity using a B+tree. Namespace 160 consumes and manages the linear logical space exposed by mapper 150. Namespace 160 will create a volume and expose the volume to the external host. Mapper 150 consumes a boot layer (not shown), user data layer 130, and metadata layer 140. The boot layer uses 3 copies of mirror images, and mapper 150 stores some important configurations to be loaded on a boot path in the boot layer. Metadata layer 140 may use 2 copies of mirror images. In metadata layer 140, mapper 150 will store metadata, such as the B+tree node. User data layer 130 uses RAID 5 and/or RAID 6, and all host user data will be stored in user data layer 130.

When processing IO, mapper 150 will generate read IO and write IO for these layers. Mapper 150 works in a log-based mode, which means that when mapper 150 writes any host data to user data layer 130, the mapper first gathers enough pages, then packs them into a 2 MB-sized PLB, and writes the PLB in the RAID. This type of mapper relates to a path capable of significantly simplifying the write IO. In user data layer 130, mapper 150 will always execute 2 MB-sized write IO, and 2 MB write will always be full-stripe writes to the RAID. For read IO on user data layer 130, the IO may be any size within 2 MB, but is usually 4K page aligned.

In addition, while not shown, the storage system may further include modules and components, such as a cache, a logger, a log data layer, and a log metadata layer. The cache provides a cache function in a memory, and has 2 instances in the system. One instance is used for user data, and the other instance is used for metadata, which provides a transaction operation function for mapper 150, so as to speed up the data access speed. When submitting a transaction, if some pages of the transaction are modified to prevent data loss, all modifications to some special layers exposed by the RAID will be retained by a logging component. A log user data layer and the log metadata layer are created on some special drives. The performance of such drives is almost the same as the performance of DRAM, and is better than the performance of SSD. The logging component consumes and manages a space of the log user data layer and the log metadata layer. The cache will use an API exposed by the logging component to load and retain dirty pages.

Figure 2:
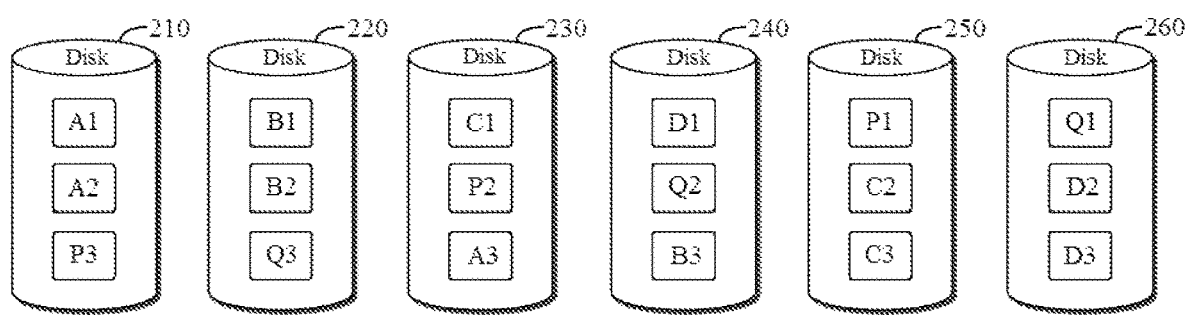
FIG. 2 shows a schematic diagram of stripes in RAID 6.

FIG. 2 shows a schematic diagram of stripes in RAID 6. As shown in FIG. 2, RAID 6 relates to disks 210, 220, 230, 240, 250, and 260. However, RAID 6 may relate to more disks. RAID 6 uses two parity disks P and Q, where P refers to ordinary XOR parity check information, while Q refers to a Reed-Solomon code. RAID 6 allows data failure of at most two disks in the RAID without causing any data loss. Generally, RAID 6 may be configured as 4 data disks+2 parity disks, or 8 data disks+2 parity disks, or 16 data disks+2 parity disks.

FIG. 2 shows a RAID 6 configuration of 4 data disks+2 parity disks. For example, data blocks A1, B1, C1, and D1 and parity blocks P1 and Q1 form a RAID 6 stripe. In a RAID 6 system, parity blocks can be used for recovering data. For example, if data block A1 in the stripe is corrupted, data of data block A1 may be recovered using parity block P1 and other data blocks B1, C1, and D1, just like RAID 5 recovery. If parity block P1 or Q1 in the stripe is corrupted, P1 or Q1 may be recalculated. If both data block A1 and parity block Q1 in the stripe are corrupted, the data of data block A1 may be recovered using parity block P1 and other data blocks B1, C1, and D1, and then data of data block Q1 is recalculated. If both data block A1 and parity block P1 in the stripe are corrupted, the data of data block A1 may be recovered using parity block Q1 and other data blocks B1, C1, and D1, and then data of data block P1 is recalculated. If both data block A1 and data block B1 in the stripe are corrupted, data of data block A1 and data block B1 may be recovered using parity block P1, parity block Q1, data block C1, and data block D1.

In some embodiments of the present disclosure, a method for recovering data is provided. The method includes determining whether data read from a RAID is corrupted, where the RAID includes two parity disks. The method further includes determining, based on determining that the read data is corrupted, whether single-disk data recovery can recover the corrupted data. The method further includes recovering, based on determining that the single-disk data recovery fails to recover the corrupted data, the corrupted data using dual-disk data recovery. In this way, the embodiments of the present disclosure present a recovery solution for silent data corruption of a RAID with two parity disks, such that corrupted data can be recovered in the case of either a single-disk failure or a dual-disk failure, thereby improving the storage system performance.

Figure 3:
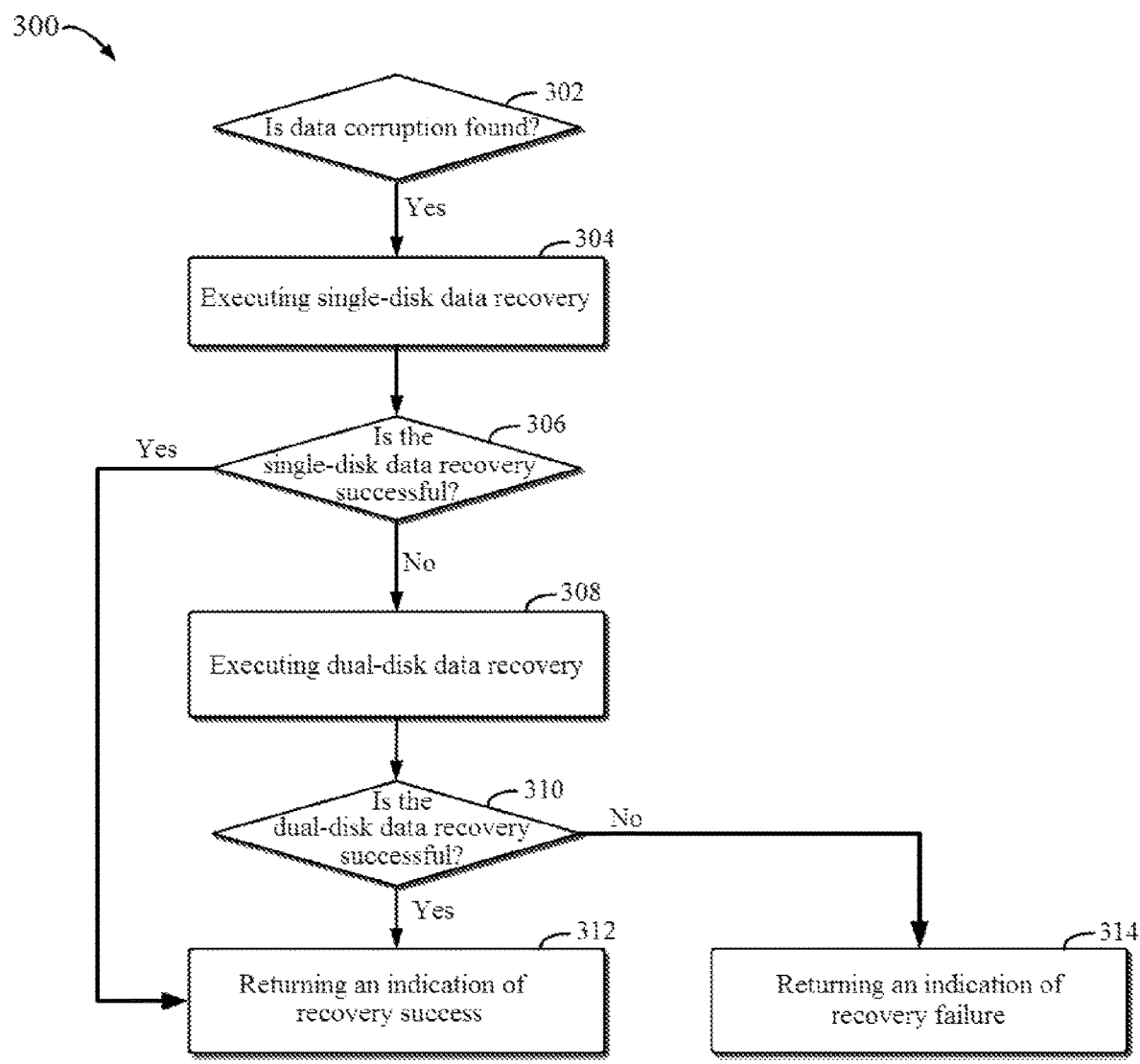
FIG. 3 shows a flowchart of a method for data corruption recovery according to an embodiment of the present disclosure.

FIG. 3 shows a flowchart of method 300 for data corruption recovery according to the present disclosure, which is a two-step method for disk data corruption recovery, and combines single-disk data recovery and dual-disk data recovery. In RAID 6, when mapper 150 finds data corruption, neither the mapper nor the RAID is aware of the number of disks on which data is corrupted. Therefore, method 300 of the present disclosure first assumes that data on only one disk is corrupted, and then attempts the single-disk data recovery mechanism, like RAID 5 recovery. If the data is successfully recovered, then the entire recovery process is successful; and otherwise, the dual-disk data recovery mechanism is further attempted. If the data is successfully recovered, then the entire recovery process is also successful; and otherwise, the entire recovery process fails, because RAID 6 cannot recover data failures on more than 2 disks.

In 302, determining whether data corruption is found. For example, mapper 150 described with reference to FIG. 1 validates whether read data is corrupted based on a predetermined checksum of data written by a data block (for example, a 4K page). When writing data, a checksum of each piece of 4K data may be calculated, and cached or saved. Then, when reading data, the read data is compared with a cached checksum to determine whether a data block being read is corrupted. This corruption is called silent data corruption. In a RAID 6 system, if one or two blocks of a stripe are corrupted, then data of the corrupted one or two blocks may be recovered through other blocks.

Figure 4:
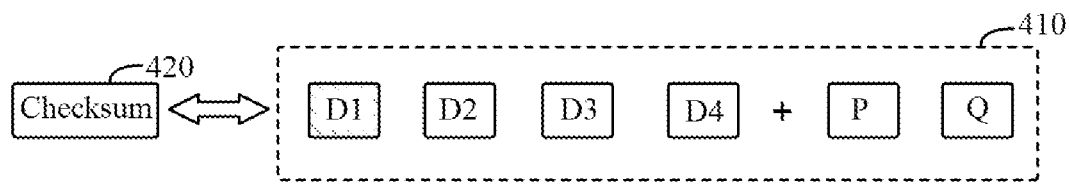
FIG. 4 shows a schematic diagram of single-disk data recovery for RAID 6 according to an embodiment of the present disclosure.
Figure 5:
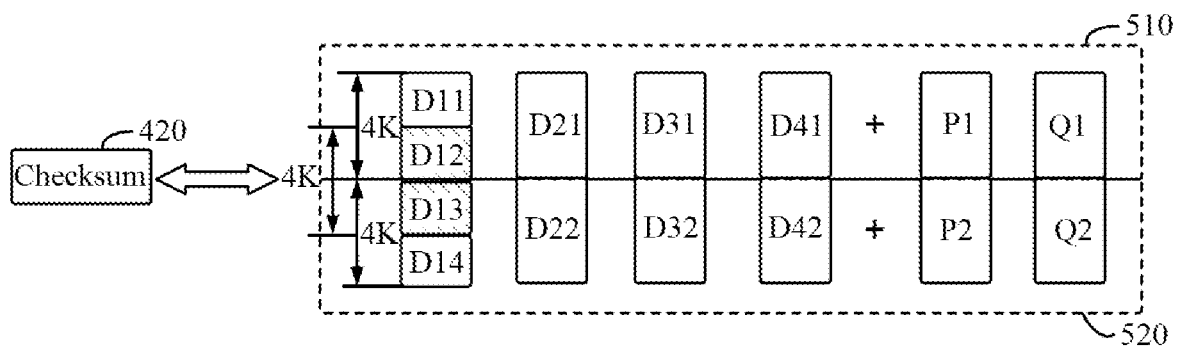
FIG. 5 shows another schematic diagram of single-disk data recovery for RAID 6 according to an embodiment of the present disclosure.

If no data corruption is found in 302, then mapper 150 may forward the data to a host normally. If data corruption is found in 302, then in 304, executing a single-disk data recovery process, i.e., assuming that a data block in a RAID 6 stripe is corrupted. FIGS. 4-5 show two examples of single-disk data recovery for RAID 6 according to an embodiment of the present disclosure.

Referring to FIG. 4, an example of single-disk data recovery where corrupted data does not span pages is shown. A checksum of data read by mapper 150 from data block D1 does not match checksum 420 for data block D1, indicating that data block D1 has data corruption, where a pattern is presented in failing data block D1, as shown in FIG. 4. Mapper 150 may send a request to the RAID for data recovery. Therefore, assuming that only data block D1 in stripe 410 of RAID 6 is corrupted, then data of data block D1 may be recovered using other data blocks D2, D3, and D4, and parity block P. Then, the recovered data is compared with checksum 420 to determine whether data recovery is successful. If the recovered data matches checksum 420, then a position of data block D1 will be filled with the recovered new data, and the recovery operation is successful.

In some embodiments, read 4K data may span two pages, thus requiring to check two data blocks. Referring to FIG. 5, an example of single-disk data recovery where corrupted data spans pages is shown. As shown in FIG. 5, mapper 150 reads 4K data from data blocks D12 and D13, and then determines that data corruption occurs based on checksum 420, where D11 and D12 are on the same 4K page, while D13 and D14 are on the same 4K page. In this case, data recovery needs to be executed twice. For RAID 6 stripe 510, data of data blocks D11 and D12 are recovered by data blocks D21, D31, and D41 and parity block P1; and for RAID 6 stripe 520, data of data blocks D13 and D14 are recovered by data blocks D22, D32, and D42 and parity block P2. Then, whether the recovery is successful is validated based on recovered data blocks D12 and D13 and checksum 420. Therefore, when the corrupted data spans pages, the single-disk recovery process in RAID 6 needs to be executed twice. In some embodiments, if data accuracy has been validated based on checksum 420 after recovering data block D12, then data block D13 is bound to be correct data. Thus, it is not necessary to execute data recovery for data block D13.

Referring back to FIG. 3, in 306, determining whether the single-disk data recovery is successful. If the single-disk data recovery is successful, then in 312, returning an indication of recovery success, and replacing the corrupted data with the recovered data at a corresponding disk location of the RAID.

Figure 6:
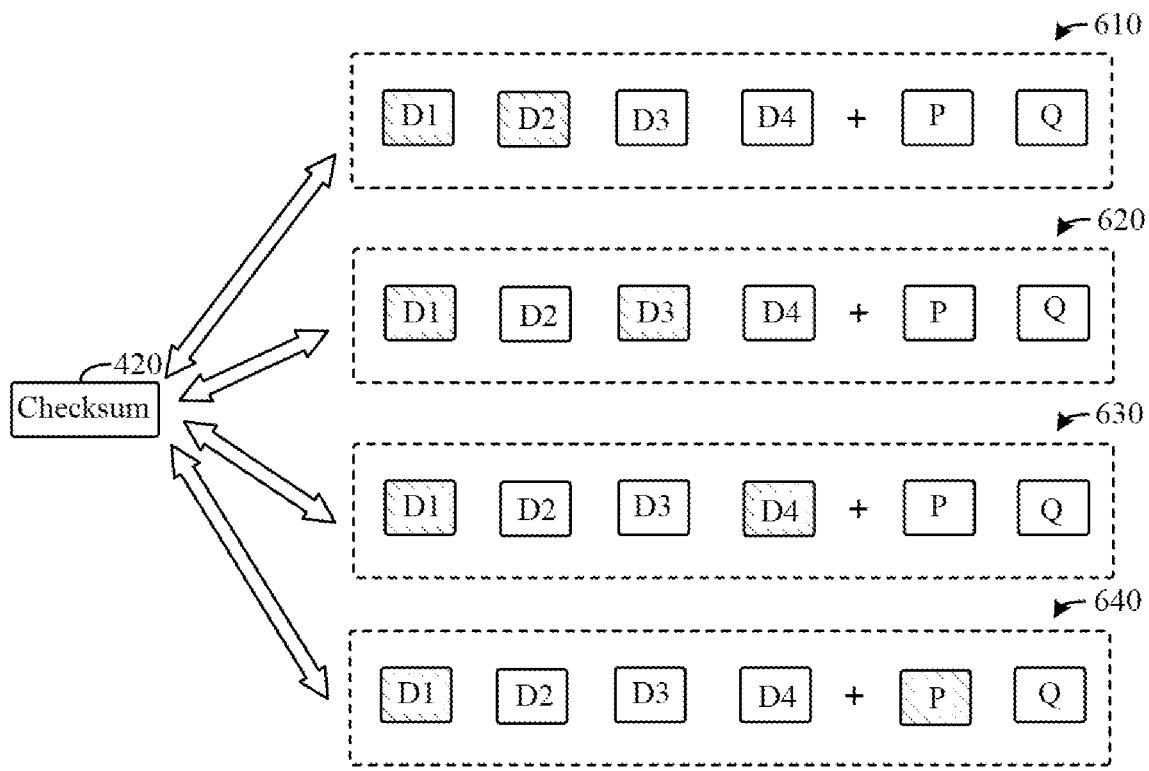
FIG. 6 shows a schematic diagram of dual-disk data recovery for RAID 6 according to an embodiment of the present disclosure.
Figure 7:
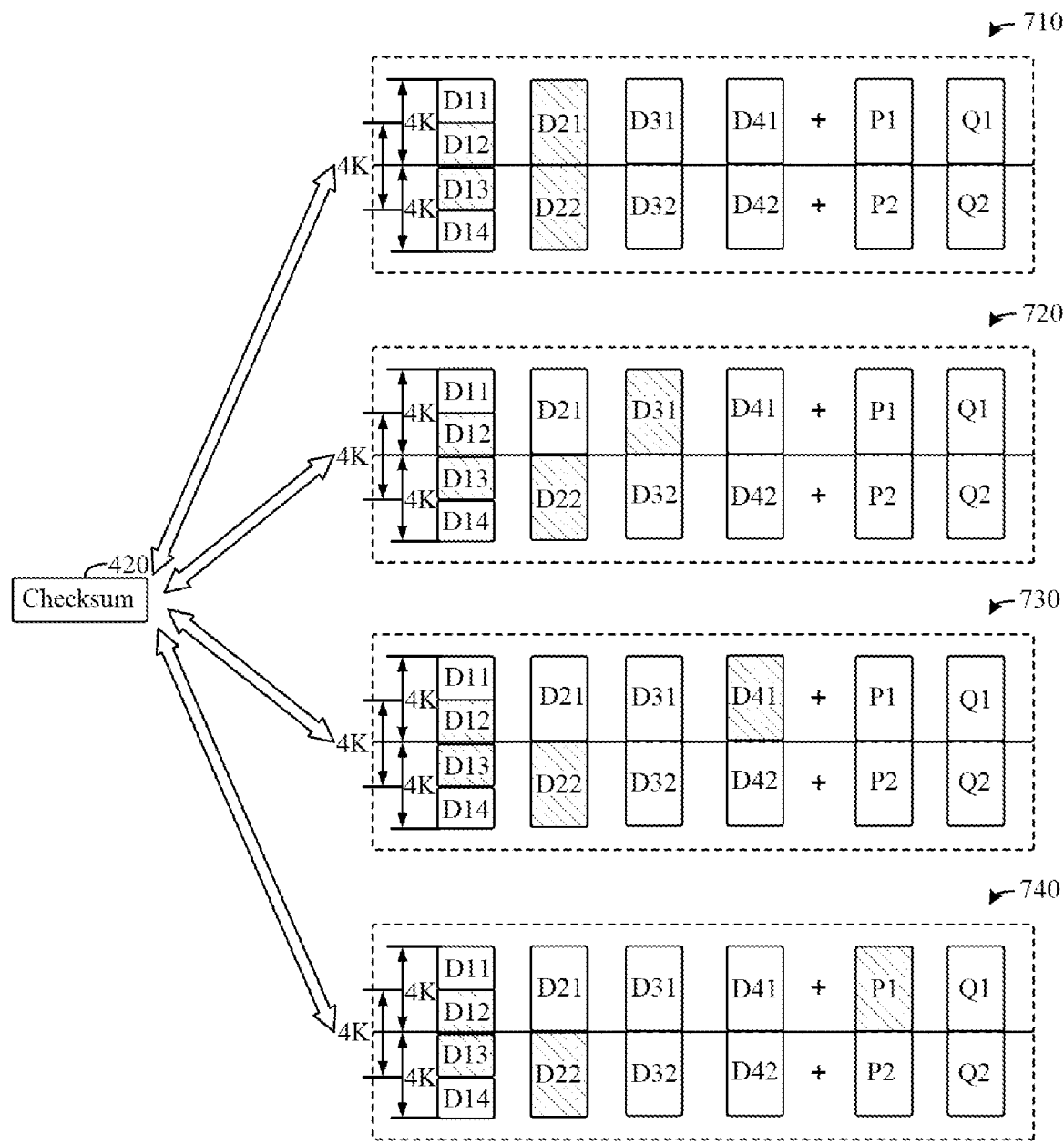
FIG. 7 shows another schematic diagram of dual-disk data recovery for RAID 6 according to an embodiment of the present disclosure.

If it is determined that the single-disk data recovery is not successful, then it is indicated that data on two or more disks is corrupted. In 308, executing dual-disk data recovery, i.e., assuming that two data blocks, or a data block and a parity block in a RAID 6stripe are corrupted. FIGS. 6-7 show two examples of dual-disk data recovery for RAID 6 according to an embodiment of the present disclosure.

FIG. 6 shows an example of dual-disk data recovery where corrupted data does not span pages. As shown in FIG. 6, all combinations of all possibly corrupted dual disks will be traversed to determine whether data can be correctly recovered. For example, for the example in FIG. 6, since it is determined that data block D1 is corrupted based on checksum 420, then a plurality of candidate combinations of the possibly corrupted dual disks includes 610, 620, 630, and 640. In combination 610, assuming that data blocks D1 and D2 are corrupted, data of data blocks D1 and D2 is recovered using data block D3, data block D4, parity block P, and parity block Q. In combination 620, assuming that data blocks D1 and D3 are corrupted, data of data blocks D1 and D3 is recovered using data block D2, data block D4, parity block P, and parity block Q. In combination 630, assuming that data blocks D1 and D4 are corrupted, data of data blocks D1 and D4 is recovered using data block D2, data block D3, parity block P, and parity block Q. In combination 640, assuming that data block D1 and parity block P are corrupted, data of data block D1 and parity block P is recovered using data block D2, data block D3, data block D4, and parity block Q. If data of data block D1 recovered by a combination can match checksum 420, then recovery is successful. If the data of data block D1 recovered by all combinations does not match checksum 420, then recovery fails.

None of the plurality of candidate combinations includes parity disk Q mainly because of two reasons below. First, for a combination of data block D1 and parity block Q, the data of data block D1 can be directly recovered through the single-disk data recovery method. Second, if both parity blocks P and Q are corrupted, then there is data corruption on at least three disks, and RAID 6 does not support such a recovery capability.

Therefore, for "4+2" RAID 6, assuming that there is a dual-disk failure and corrupted data is in a single page, then at most 4 data recovery operations need to be executed. For "8+2" RAID 6, at most 8 data recovery operations need to be executed. For "16+2" RAID 6, at most 16 data recovery operations need to be executed.

In some embodiments, read 4K data may span two pages, thus requiring to check two data blocks and to perform more times of check. Referring to FIG. 7, an example of dual-disk data recovery where corrupted data spans pages is shown. In the case of finding data corruption of data blocks D12 and D13, if only data block D12 is corrupted, then only data blocks D11+D12 need to be recovered. The execution process is similar to that of FIG. 6, and at most 4 data recovery operations need to be executed only. Similarly, if only data block D13 is corrupted, then only data blocks D13+D14 need to be recovered, and the execution process is similar to that of FIG. 6.

If both data blocks D12 and D13 are corrupted, then not only data blocks D11+D12 need to be recovered, but also data blocks D13+D14 need to be recovered, and then there are 4×4 combinations. Referring to FIG. 7, it is known that both D11+D12 and D13+D14 are corrupted. Assuming that D22 is corrupted, then possible combinations include 710, 720, 730, and 740. In addition, assuming that D32 is corrupted, D42 is corrupted, and P2 is corrupted, there are also four combinations respectively. Therefore, for RAID 6 with a RAID width of R, at most R×(R−2) combinations are required. For example, for "16+2" RAID 6, there are 288 combinations.

Referring back to FIG. 3, in 310, determining whether the dual-disk data recovery is successful. If the dual-disk data recovery is successful, then in 312, returning an indication of recovery success, and replacing the corrupted data with the recovered data at a corresponding disk location of the RAID. If the dual-disk data recovery is still unsuccessful, then data on more than two disks is corrupted, and a RAID 6 mechanism cannot recover the data. Therefore, in 314, returning an indication of recovery failure, e.g., returning an uncorrectable error message. In this way, the dual-disk failure recovery of silent data corruption in RAID 6 is implemented. Thus, some embodiments of the present disclosure present a recovery solution for silent data corruption of RAID 6, such that corrupted data can be recovered in the case of either a single-disk failure or a dual-disk failure, thereby improving the storage system performance.

Figure 8:
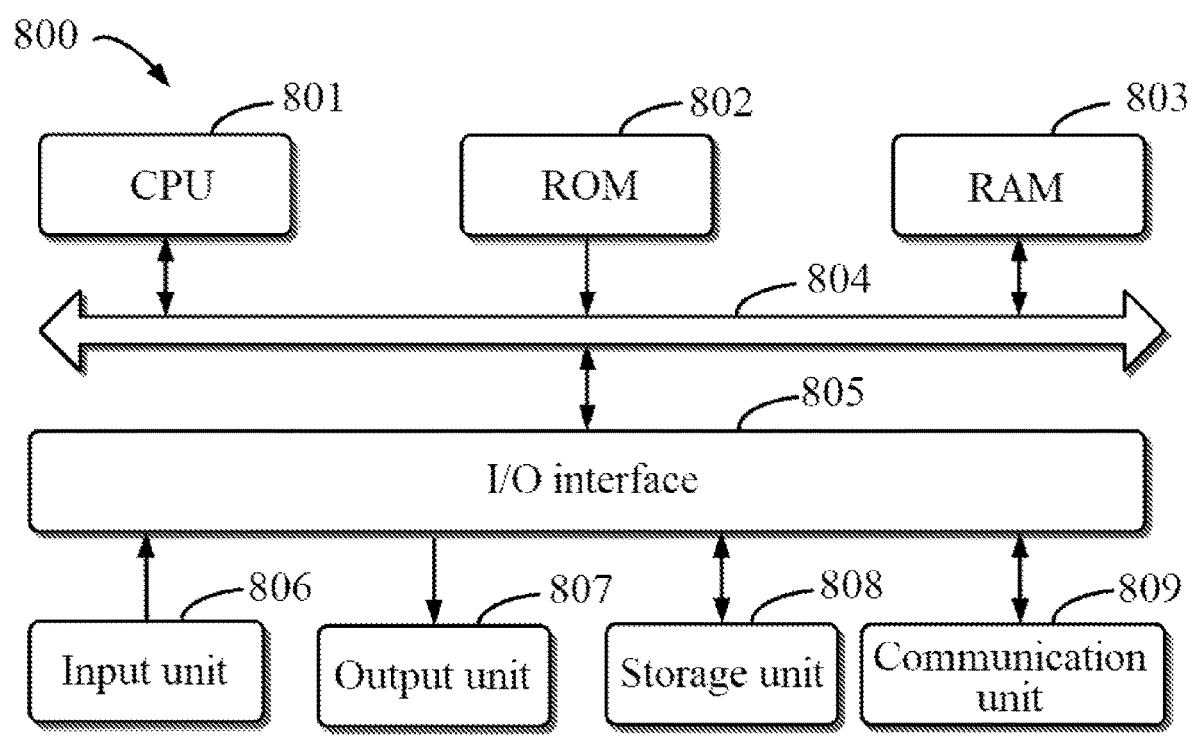
FIG. 8 shows a schematic block diagram of a device that may be configured to implement the embodiments of the present disclosure.

FIG. 8 shows a schematic block diagram of device 800 that may be configured to implement the embodiments of the present disclosure. Device 800 may be the device or apparatus described in the embodiments of the present disclosure. As shown in FIG. 8, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. RAM 803 may further store various programs and data required for operations of device 800. CPU 801, ROM 802, and RAM 803 are connected to each other through bus 804. An input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The methods or processes described above may be executed by processing unit 801. For example, in some embodiments, the method may be embodied as a computer software program that is tangibly included in a machine-readable medium, such as storage unit 808. In some embodiments, some of or all the computer program can be loaded into and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium with computer-readable program instructions for executing various aspects of the present disclosure loaded thereon.

The computer-readable storage medium may be a tangible device that can retain and store instructions used by an instruction executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or in-groove protruding structures with instructions stored thereon, and any suitable combination thereof. The computer-readable storage medium used herein is not construed as transient signals themselves, such as radio waves or other freely propagated electromagnetic waves, electromagnetic waves propagated through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source codes or object codes written in any combination of one or more programming languages. The programming languages include object-oriented programming languages, and conventional procedural programming languages. The computer-readable program instructions can be executed entirely on a user computer, partly on a user computer, as a separate software package, partly on a user computer and partly on a remote computer, or entirely on a remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The computer-readable program instructions may be executed by the electronic circuit to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may occur in a sequence different from that shown in the figures. For example, any two blocks presented in succession may actually be executed substantially in parallel, or may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or technological improvements of the technologies on the market, or to enable other persons of ordinary skills in the art to understand the embodiments disclosed herein.

The invention claimed is:

1. A method for recovering data, comprising:
   determining whether data read from a redundant array of independent disks (RAID) is corrupted;
   determining, based on determining that the read data is corrupted, whether single-disk data recovery can recover the corrupted data; and
   recovering, based on determining that the single-disk data recovery fails to recover the corrupted data, the corrupted data using dual-disk data recovery;
   wherein recovering the corrupted data using dual-disk data recovery comprises:
   determining whether the corrupted data relates to both a first page and a second page in the first data disk; and
   based on determining that the corrupted data relates to both the first page and the second page:
      determining, for a first stripe relating to the first page, a first group of candidate combinations for a dual-disk failure of the first stripe;
      determining, for a second stripe relating to the second page, a second group of candidate combinations for a dual- disk failure of the second stripe; and
      obtaining a third group of candidate combinations based on the first group of candidate combinations and the second group of candidate combinations.

2. The method according to claim 1, wherein determining whether the read data is corrupted comprises:
   validating whether the data is corrupted based on a predetermined checksum.

3. The method according to claim 2, wherein recovering the corrupted data using dual-disk data recovery further comprises:
   determining, based on the checksum, a first data disk with the corrupted data.

4. The method according to claim 3, wherein recovering the corrupted data using dual-disk data recovery further comprises:
   recovering corresponding data in two candidate failing disks using a first candidate combination;
   determining whether the data recovered by the first candidate combination is correct based on the checksum; and
   recovering, based on determining that the data recovered by the first candidate combination is incorrect, the corresponding data in the two candidate failing disks using a second candidate combination.

5. The method according to claim 1, wherein recovering the corrupted data using dual-disk data recovery further comprises:
   recovering corresponding data in the first stripe and corresponding data in the second stripe respectively using each candidate combination in the third group of candidate combinations, until the corrupted data is correctly recovered.

6. The method according to claim 1, wherein recovering the corrupted data using dual-disk data recovery further comprises:
   replacing, based on determining that the dual-disk data recovery can recover the corrupted data, the corrupted data with recovered data at a corresponding disk location in the RAID; and
   generating, based on determining that the dual-disk data recovery fails to recover the corrupted data, a prompt for recovery failure.

7. The method according to claim 1, wherein the RAID is RAID 6 comprising at least four data disks and the two parity disks.

8. The method according to claim 1, wherein the RAID is a RAID 6 configuration which utilizes, for each stripe, at least four data blocks and two parity blocks.

9. The method according to claim 8, wherein, for each stripe, the two parity blocks include a first block containing XOR parity check information and a second block containing a Reed-Solomon code.

10. The method according to claim 8, wherein the RAID 6 configuration utilizes, for each stripe, four data blocks and two parity blocks.

11. The method according to claim 8, wherein the RAID 6 configuration utilizes, for each stripe, eight data blocks and two parity blocks.

12. The method according to claim 8, wherein the RAID 6 configuration utilizes, for each stripe, 16 data blocks and two parity blocks.

13. An electronic device, comprising:
   a processing unit; and
   a memory coupled to the processing unit and storing instructions, the instructions, when executed by the processing unit, executing following actions:
      determining whether data read from a redundant array of independent disks (RAID) is corrupted;
      determining, based on determining that the read data is corrupted, whether single-disk data recovery can recover the corrupted data; and
      recovering, based on determining that the single-disk data recovery fails to recover the corrupted data, the corrupted data using dual-disk data recovery;
   wherein recovering the corrupted data using dual-disk data recovery comprises:
      determining whether the corrupted data relates to both a first page and a second page in the first data disk; and
      based on determining that the corrupted data relates to both the first page and the second page:
         determining, for a first stripe relating to the first page, a first group of candidate combinations for a dual-disk failure of the first stripe;
         determining, for a second stripe relating to the second page, a second group of candidate combinations for a dual- disk failure of the second stripe; and
         obtaining a third group of candidate combinations based on the first group of candidate combinations and the second group of candidate combinations.

14. The device according to claim 13, wherein determining whether the read data is corrupted comprises:
   validating whether the data is corrupted based on a predetermined checksum.

15. The device according to claim 14, wherein recovering the corrupted data using dual-disk data recovery further comprises:
   determining, based on the checksum, a first data disk with the corrupted data.

16. The device according to claim 15, wherein recovering the corrupted data using dual-disk data recovery further comprises:
  recovering corresponding data in two candidate failing disks using a first candidate combination;
  determining whether the data recovered by the first candidate combination is correct based on the checksum; and
  recovering, based on determining that the data recovered by the first candidate combination is incorrect, the corresponding data in the two candidate failing disks using a second candidate combination.

17. The device according to claim 13, wherein recovering the corrupted data using dual-disk data recovery further comprises:
  recovering corresponding data in the first stripe and corresponding data in the second stripe respectively using each candidate combination in the third group of candidate combinations, until the corrupted data is correctly recovered.

18. The device according to claim 13, wherein recovering the corrupted data using dual-disk data recovery further comprises:
  replacing, based on determining that the dual-disk data recovery can recover the corrupted data, the corrupted data with recovered data at a corresponding disk location in the RAID; and
  generating, based on determining that the dual-disk data recovery fails to recover the corrupted data, a prompt for recovery failure.

19. The device according to claim 13, wherein the RAID is RAID 6 comprising at least four data disks and the two parity disks.

20. A computer program product having a non-transitory computer readable medium which stores a set of instructions to recover data; the set of instructions, when carried out by computerized circuitry, causing the computerized circuitry to perform a method of:
  determining whether data read from a redundant array of independent disks (RAID) is corrupted;
  determining, based on determining that the read data is corrupted, whether single-disk data recovery can recover the corrupted data; and
  recovering, based on determining that the single-disk data recovery fails to recover the corrupted data, the corrupted data using dual-disk data recovery;
wherein recovering the corrupted data using dual-disk data recovery comprises:
  determining whether the corrupted data relates to both a first page and a second page in the first data disk; and
  based on determining that the corrupted data relates to both the first page and the second page:
    determining, for a first stripe relating to the first page, a first group of candidate combinations for a dual-disk failure of the first stripe;
    determining, for a second stripe relating to the second page, a second group of candidate combinations for a dual- disk failure of the second stripe; and
    obtaining a third group of candidate combinations based on the first group of candidate combinations and the second group of candidate combinations.

* * * * *